(12) United States Patent
Matias-Vega et al.

(10) Patent No.: US 12,473,837 B2
(45) Date of Patent: Nov. 18, 2025

(54) OUTER AIR SEAL (OAS) WITH IMPROVED MATING WITH FIRST STAGE CASING

(71) Applicant: RTX Corporation, Farmington, CT (US)

(72) Inventors: Pablo Junior Matias-Vega, Dover, NH (US); Nicholas Ryan Leslie, Tucson, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/541,889

(22) Filed: Dec. 15, 2023

(65) Prior Publication Data
US 2025/0198298 A1   Jun. 19, 2025

(51) Int. Cl.
*F01D 11/08* (2006.01)
*F01D 25/24* (2006.01)

(52) U.S. Cl.
CPC .............. *F01D 11/08* (2013.01); *F01D 25/24* (2013.01); *F05D 2220/32* (2013.01); *F05D 2240/11* (2013.01); *F05D 2240/14* (2013.01); *F05D 2240/55* (2013.01)

(58) Field of Classification Search
None
See application file for complete search history.

(56) References Cited

U.S. PATENT DOCUMENTS

| | | | |
|---|---|---|---|
| 6,076,835 A * | 6/2000 | Ress | F01D 11/005 277/637 |
| 6,984,106 B2 | 1/2006 | Thompson | |
| 10,633,994 B2 | 4/2020 | Barker | |
| 2011/0044804 A1 | 2/2011 | Dipaola et al. | |

FOREIGN PATENT DOCUMENTS

| | | |
|---|---|---|
| EP | 3404214 A1 | 11/2018 |
| EP | 3103965 B1 | 8/2021 |

OTHER PUBLICATIONS

Search Report issued in European Patent Application No. 24220366. 9; Date of Mailing May 7, 2025 (8 pages).

* cited by examiner

*Primary Examiner* — Juan G Flores
(74) *Attorney, Agent, or Firm* — CANTOR COLBURN LLP

(57) ABSTRACT

A compressor of a gas turbine engine is provided. The compressor includes a casing including an elongate body having an aft surface at an aft end thereof and an outer air seal (OAS) disposed aft of the casing. The OAS includes at a forward end thereof a first forward surface, a second forward surface inboard of and recessed aftward from the first forward surface and a transitional surface radially interposed between the first and second forward surfaces. The aft surface of the casing is axially interposed between the first and second forward surfaces of the OAS.

20 Claims, 3 Drawing Sheets

OUTER AIR SEAL (OAS) WITH IMPROVED MATING WITH FIRST STAGE CASING

BACKGROUND

Exemplary embodiments of the present disclosure relate generally to gas turbine engines and, in one embodiment, to an outer air seal (OAS) with an improved mating with a first stage casing.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or fan or to produce electricity in a generator.

In a gas turbine engine, both the compressor and the turbine can have several stages. In the compressor, in particular, at least the first (forwardmost) stage can include a stage 1 OAS that is disposed aft of a casing treatment. The casing treatment and the stage 1 OAS are often designed cooperatively such that they can interface with one another and maintain a seal to prevent leakage of the working fluid.

Thus, when changes to casing treatment configurations are proposed and, it is often the case that needs exist for corresponding stage 1 OAS redesigns.

BRIEF DESCRIPTION

According to an aspect of the disclosure, a compressor of a gas turbine engine is provided. The compressor includes a casing including an elongate body having an aft surface at an aft end thereof and an outer air seal (OAS) disposed aft of the casing. The OAS includes at a forward end thereof a first forward surface, a second forward surface inboard of and recessed aftward from the first forward surface and a transitional surface radially interposed between the first and second forward surfaces. The aft surface of the casing is axially interposed between the first and second forward surfaces of the OAS.

In accordance with additional or alternative embodiments, the elongate body curves radially inwardly.

In accordance with additional or alternative embodiments, the aft surface and the first and second forward surfaces are oriented along a radial plane.

In accordance with additional or alternative embodiments, the aft surface and the first and second forward surfaces are parallel.

In accordance with additional or alternative embodiments, the OAS is disposed immediately aft of the elongate body of the casing.

In accordance with additional or alternative embodiments, the transitional surface is concave.

In accordance with additional or alternative embodiments, an inboard portion of the transitional surface is outboard of the aft surface.

In accordance with additional or alternative embodiments, the transitional surface is curved radially inwardly and aftwardly.

In accordance with additional or alternative embodiments, the second forward surface is immediately adjacent to the aft surface to form a bleed air slot.

In accordance with additional or alternative embodiments, the OAS includes an aft end and a central section axially interposed between the forward end and the aft end and including a flat outboard surface.

According to an aspect of the disclosure, a forward end of an outer air seal (OAS) of a compressor of a gas turbine engine is provided. The forward end of the OAS includes a first forward surface, a second forward surface inboard of and recessed aftward from the first forward surface and a transitional surface radially interposed between the first and second forward surfaces.

In accordance with additional or alternative embodiments, the first and second forward surfaces are oriented along a radial plane.

In accordance with additional or alternative embodiments, the first and second forward surfaces are parallel.

In accordance with additional or alternative embodiments, the transitional surface is concave.

In accordance with additional or alternative embodiments, the transitional surface is curved radially inwardly and aftwardly.

In accordance with additional or alternative embodiments, the second forward surface partially defines a bleed air slot.

According to an aspect of the disclosure, a compressor of a gas turbine engine is provided. The compressor includes a casing comprising an elongate body having an aft end and an outer air seal (OAS) disposed aft of the casing. The OAS includes a forward end configured to conform to a shape of the aft end of the casing and to form a bleed air slot with the aft end of the casing.

In accordance with additional or alternative embodiments, the elongate body curves radially inwardly.

In accordance with additional or alternative embodiments, the aft end of the elongate body is convex and the forward end of the OAS is concave and complementary with the aft end of the elongate body.

In accordance with additional or alternative embodiments, the aft end of the elongate body includes an inboard aft facing surface and an outboard surface extending curvilinearly from the inboard aft facing surface and the forward end of the OAS includes an inboard forward facing surface and an outboard surface extending curvilinearly from the inboard forward facing surface.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
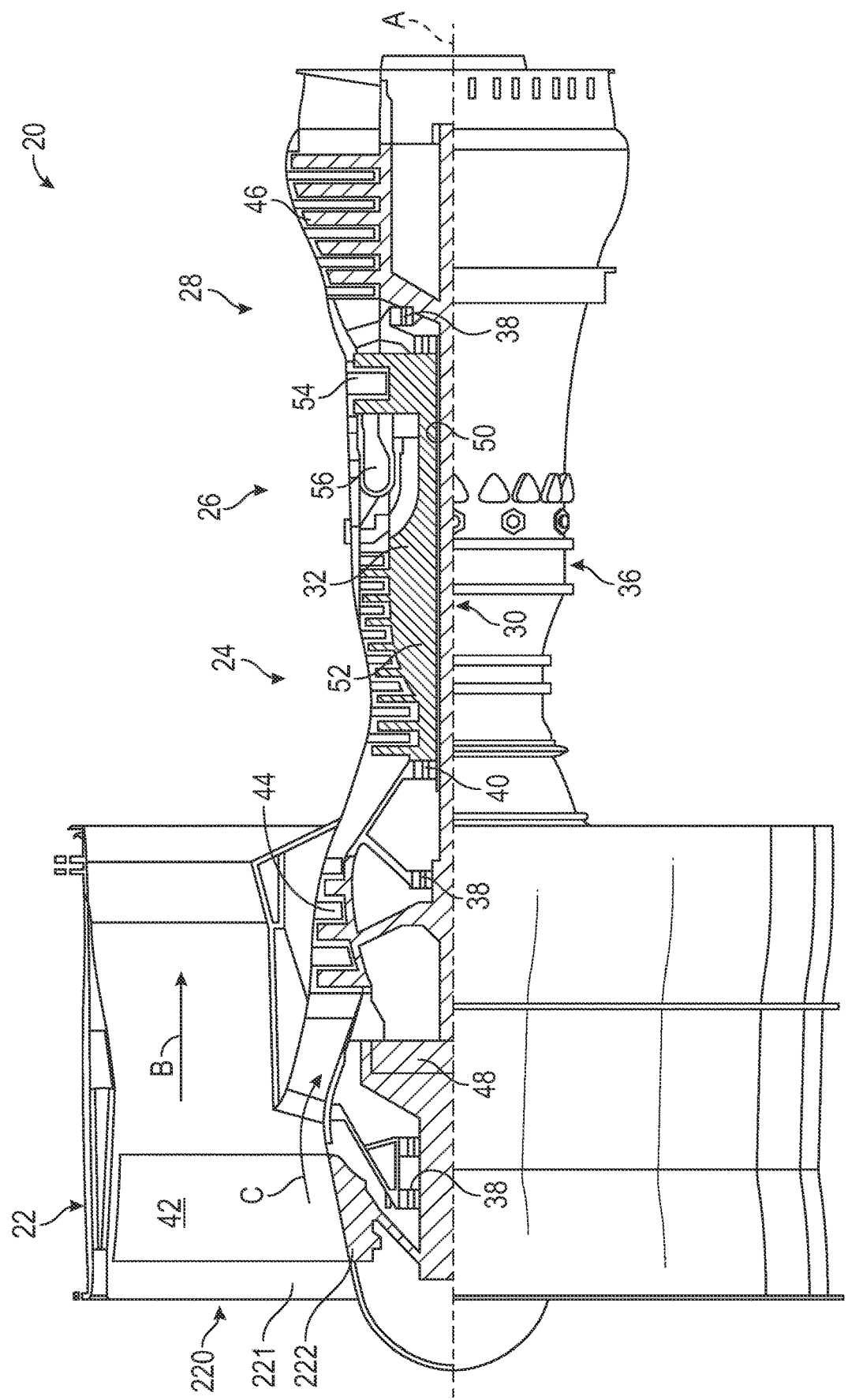
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Recent changes to gas turbine engines, such as the gas turbine engine 20 of FIG. 1, have been proposed. Often these changes necessitate other changes. For example, in a case in which a redesign of a casing treatment arranged forward of a stage 1 outer air seal (OAS) is proposed, corresponding changes to the stage 1 OAS are similarly proposed. Therefore, as will be described below, for a gas turbine engine, a redesign of a casing treatment necessitates a corresponding redesign of a stage 1 OAS.

Figure 2:
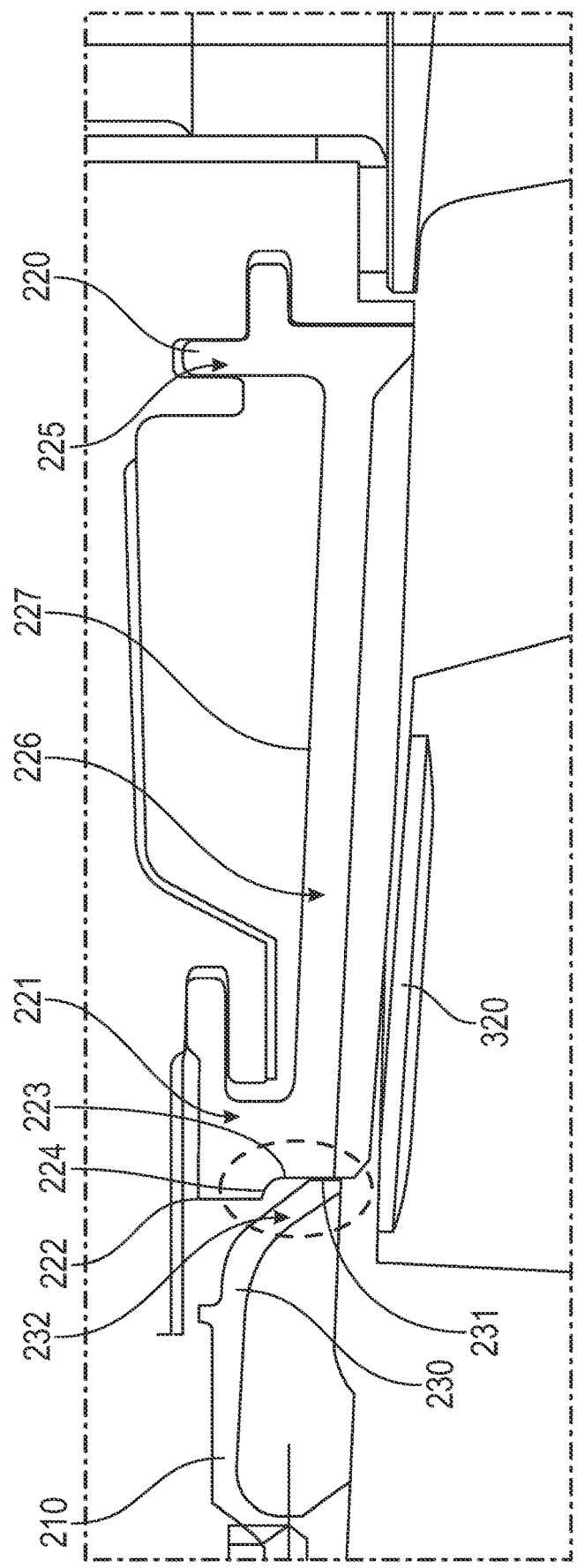
FIG. 2 is a cross-sectional view of a casing and an outer air seal (OAS) of a compressor of a gas turbine engine in accordance with embodiments.
Figure 3:
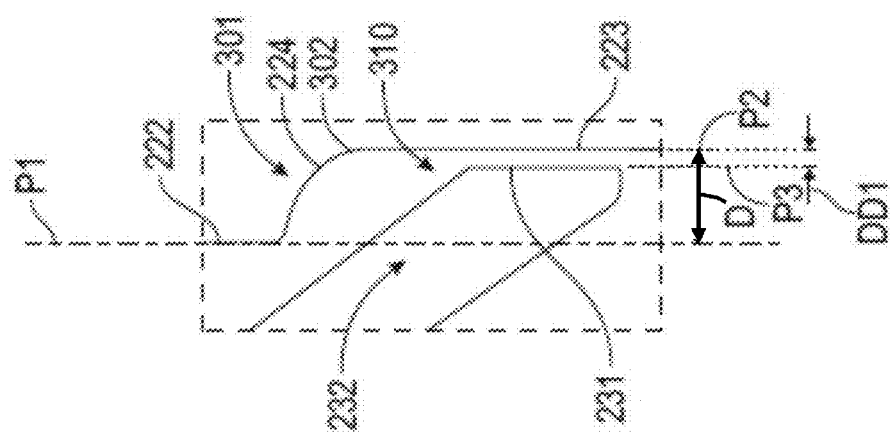
FIG. 3 is an enlarged cross-sectional view of the encircled portion of FIG. 2 in accordance with embodiments.

With reference to FIGS. 2 and 3, a compressor of a gas turbine engine, such as the compressor section 24 of the gas turbine engine 20 of FIG. 1, is provided. The compressor includes a casing 210 and an OAS 220. The casing 210 includes an elongate body 230 having an aft surface 231 at an aft end 232 thereof. The elongate body 230 curves radially inwardly with increasing distance in the aft direction (i.e., decreasing distance toward the OAS 220).

The OAS 220 is disposed aft of the casing 210 and has a forward end 221 thereof. At the forward end 221, the OAS 220 includes a first forward surface 222 having a plane P1 (i.e., the first forward surface 222 can be oriented along a radial plane), a second forward surface 223 having a plane P2 (i.e., the second forward surface can be oriented along a radial plane) and a transitional surface 224. The second forward surface 223 is inboard of and recessed aftward from the first forward surface 222 by a distance D defined between plane P1 and plane P2.

In accordance with embodiments, the OAS 220 can further include an aft end 225 and a central section 226 that is axially interposed between the forward end 221 and the aft end 225. As shown in FIG. 2, the central section 226 can include a flat outboard surface 227 for improved manufacturability of the OAS 220.

The transitional surface 224 is radially interposed between the first forward surface 222 and the second forward surface 223. The transitional surface 224 has a concave curvature 301 that is curved radially inwardly and aftwardly (see FIG. 3) with an inboard portion 302 that is outboard of the aft surface 231 (see FIG. 3). The aft surface 231 of the elongate body 230 of the casing 210 has a plane P3 (i.e., the aft surface 231 can be oriented along a radial plane). The aft surface 231 and the plane P3 are axially interposed between the first and second forward surfaces 222 and 223 and their respective planes P1 and P2. In accordance with embodiments, the aft surface 231, the first forward surface 222 and the second forward surface 223 can be oriented in parallel.

In accordance with embodiments as shown in FIG. 3, the OAS 220 is disposed immediately aft of the elongated body 230 of the casing 210 with the second forward surface 223 being immediately adjacent to the aft surface 231 at a displacement distance DD1 to form a bleed air slot 310. Bleed air flowing outwardly from the compressor due to the aerodynamic effects of the compressor blade 320 (see FIG. 2) flows radially outwardly through the bleed air slot 310 and is then forced axially forwardly by the concave curvature 301 of the transitional surface 224.

Figure 4:
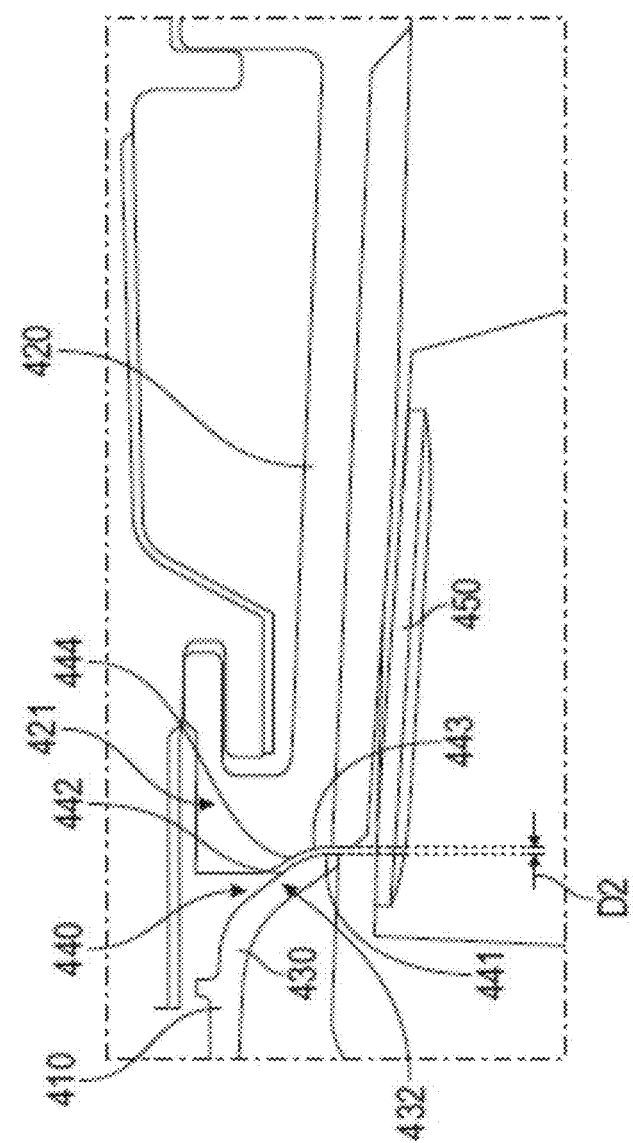
FIG. 4 is a cross-sectional view of a casing and a conformal outer air seal (OAS) of a compressor of a gas turbine engine in accordance with embodiments.

With reference to FIG. 4, a compressor of a gas turbine engine, such as the compressor section 24 of the gas turbine engine 20 of FIG. 1, is provided. The compressor includes a casing 410 and an OAS 420. The casing 410 includes an elongate body 430 having an aft end 432. The elongate body 430 curves radially inwardly with increasing distance in the aft direction (i.e., decreasing distance toward the OAS 420). The OAS 420 is disposed aft of the casing 410 and has a forward end 421 thereof.

As shown in FIG. 4, the forward end 421 of the OAS 420 is configured to conform to a shape of the aft end 432 of the elongate body 430 of the casing 410. With the forward end 421 of the OAS 420 being slightly displaced from the aft end 432 of the elongate body 430 by displacement distance D2, the forward end 421 forms a bleed air slot 440 with the aft end 432 of the elongate body 430. In accordance with embodiments, the aft end 432 of the elongate body 430 can be convex and the forward end 421 of the OAS 420 can be concave and complementary with the aft end 432 of the elongate body 430. In accordance with further embodiments, the aft end 432 of the elongate body 430 can include an inboard aft facing surface 441 and an outboard surface 442 extending curvilinearly from the inboard aft facing surface 441 and the forward end 421 of the OAS 420 can include an inboard forward facing surface 443 and an outboard surface 444 extending curvilinearly from the inboard forward facing surface 443.

As above, bleed air flowing outwardly from the compressor due to the aerodynamic effects of the proximal compressor blade 450 flows radially outwardly through the bleed air slot 440 and is then forced axially forwardly by the conformal curvature of the bleed air slot 440.

Benefits of the features described herein are the provision of a redesigned casing treatment with an elongate body and an OAS that is compatible with the redesigned casing treatment and that has improved manufacturability.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor of a gas turbine engine, the compressor comprising:
    a casing comprising an elongate body having an aft surface at an aft end thereof; and
    an outer air seal (OAS) disposed aft of the casing and comprising at a forward end thereof:
        a first forward surface;
        a second forward surface inboard of and recessed aftward from the first forward surface; and
        a transitional surface radially interposed between the first and second forward surfaces,
    the aft surface of the elongate body being axially interposed between the first and second forward surfaces of the OAS,
    wherein the elongate body comprises inboard and outboard surfaces that each curve radially inwardly with decreasing distance toward the OAS.

2. The compressor according to claim 1, wherein the aft surface and the first and second forward surfaces are oriented along a radial plane.

3. The compressor according to claim 2, wherein the aft surface and the first and second forward surfaces are parallel.

4. The compressor according to claim 1, wherein the OAS is disposed immediately aft of the aft surface of the elongate body of the casing.

5. The compressor according to claim 1, wherein the transitional surface is concave.

6. The compressor according to claim 1, wherein an inboard portion of the transitional surface is outboard of the aft surface.

7. The compressor according to claim 1, wherein the transitional surface is curved radially inwardly and aftwardly.

8. The compressor according to claim 1, wherein the second forward surface is immediately adjacent to the aft surface of the elongate body to form a bleed air slot.

9. The compressor according to claim 1, wherein the OAS comprises:
    an aft end; and
    a central section axially interposed between the forward end and the aft end and comprising a flat outboard surface.

10. The compressor according to claim 1, wherein a curvature of the inboard surface of the elongate body terminates at an aft end of the inboard surface immediately forward of the aft surface.

11. A compressor of a gas turbine engine, the compressor comprising:
    a forward end of an outer air seal (OAS) comprising:
        a first forward surface;
        a second forward surface inboard of and recessed aftward from the first forward surface; and
        a transitional surface radially interposed between the first and second forward surfaces,
    wherein:
        the compressor further comprises a casing comprising an elongate body,
        the OAS is disposed aft of an aft end of the elongate body, and
        the elongate body comprises inboard and outboard surfaces that each curve radially inwardly with decreasing distance toward the OAS.

12. The compressor according to claim 11, wherein the first and second forward surfaces are oriented along a radial plane.

13. The compressor according to claim 12, wherein:
    the first and second forward surfaces are parallel with the aft end of the elongate body, and
    the aft end of the elongate body is axially interposed between the first and second forward surfaces of the OAS.

14. The compressor according to claim 11, wherein the transitional surface is concave.

15. The compressor according to claim 11, wherein the transitional surface is curved radially inwardly and aftwardly.

16. The compressor according to claim 11, wherein the second forward surface partially defines a bleed air slot.

17. A compressor of a gas turbine engine, the compressor comprising:
    a casing comprising an elongate body having an aft end; and
    an outer air seal (OAS) comprising at a forward end thereof:
        a first forward surface;
        a second forward surface inboard of and recessed aftward from the first forward surface; and
        a transitional surface radially interposed between the first and second forward surfaces, wherein:
the aft end of the elongate body is axially interposed between the first and second forward surfaces of the OAS, and
the elongate body comprises inboard and outboard surfaces that each curve radially inwardly with decreasing distance toward the OAS.

18. The compressor according to claim 17, wherein:
the aft surface and the first and second forward surfaces are oriented along a radial plane in parallel with the aft end of the elongate body, and
the transitional surface is concave and an inboard portion of the transitional surface is outboard of the aft end of the elongate body.

19. The compressor according to claim 17, wherein the second forward surface forms a bleed air slot with the aft end of the elongate body.

20. The compressor according to claim 17, wherein a curvature of the inboard surface of the elongate body terminates immediately forward of the aft end.

* * * * *